US 6,679,040 B2

(12) United States Patent
Lucand et al.

(10) Patent No.: US 6,679,040 B2
(45) Date of Patent: Jan. 20, 2004

(54) LARGE ROUND BALER WITH BALING CHAMBER INCLUDING ONE OR MORE CONVEYOR ROLLS MOVABLE BETWEEN BALE-FORMING AND DISCHARGE POSITIONS

(75) Inventors: Philippe Lucand, Melin (FR); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 86 days.

(21) Appl. No.: 10/021,595

(22) Filed: Dec. 17, 2001

(65) Prior Publication Data

US 2002/0078674 A1 Jun. 27, 2002

(30) Foreign Application Priority Data

Dec. 18, 2000 (DE) .......................................... 100 63 120

(51) Int. Cl.⁷ ............................................... A01D 39/00
(52) U.S. Cl. ........................................ 56/341; 100/88
(58) Field of Search ...................... 56/341, 343; 100/88

(56) References Cited

U.S. PATENT DOCUMENTS

| 3,914,926 | A | * | 10/1975 | Braunberger et al. | .......... 56/341 |
| 4,208,862 | A | | 6/1980 | Waldrop et al. | .............. 56/341 |
| 4,288,971 | A | | 9/1981 | McClure | ....................... 56/341 |
| 4,549,481 | A | * | 10/1985 | Groeneveld et al. | ...... 100/98 R |
| 4,597,254 | A | * | 7/1986 | Bowden, Jr. | .................. 56/341 |
| 4,667,592 | A | * | 5/1987 | Pentith et al. | ................. 100/88 |
| 5,134,839 | A | | 8/1992 | Clostermeyer et al. | ....... 56/341 |

FOREIGN PATENT DOCUMENTS

| EP | 0 894 428 | 2/1999 |
| EP | 1 000 534 | 5/2000 |
| FR | 2 783 131 | 3/2000 |
| NL | 8 501 416 | 12/1986 |

OTHER PUBLICATIONS

Derwent Abstract of NL 8501416.*
Database WPI, Section PQ, Week 198652, Derwent Publications Ltd., London, GB, Class P12, AN 1986–344719, XP002191008 * (in conjunction with NL 8 501 416A listed above).

* cited by examiner

Primary Examiner—Robert E. Pezzuto
Assistant Examiner—Meredith Petravick

(57) ABSTRACT

A large round baler includes an expansible baling chamber having an inlet at a forward location thereof and defined in part by a lower run of a flexible, endless component arrangement of an upper conveyor, and by an upper run of a flexible, endless component arrangement of a bottom conveyor. In each of two embodiments, the bottom conveyor includes a moveable roller which operates to selectively deflect the upper run of the bottom conveyor so that it cooperates with a lower run of the upper conveyor so as to define a baling chamber having a cross section conducive to starting a bale core at the beginning of the baling process and moveable to a discharge position for allowing a completed bale to roll onto the ground. In the second embodiment, the upper conveyor also includes a moveable roller that operates to yieldably resist expansion of the lower run of the upper conveyor.

11 Claims, 5 Drawing Sheets

LARGE ROUND BALER WITH BALING CHAMBER INCLUDING ONE OR MORE CONVEYOR ROLLS MOVABLE BETWEEN BALE-FORMING AND DISCHARGE POSITIONS

FIELD OF THE INVENTION

The invention pertains to baling chambers of large round balers, and more specifically relates to such chambers as are provided with a bottom conveyor for aiding in the support and discharge of a bale.

BACKGROUND OF THE INVENTION

A round baler known from U.S. Pat. No. 4,208,862 features a baling chamber defined in part by an upper, expansible conveyor, that conforms to the shape of a bale being formed, and a lower conveyor which supports the bale and cooperates with the upper conveyor in discharging the bale. At the beginning of the baling process the baling chamber is of a wedge-shaped cross section of short height and long sides converging to the rear of the baler.

The patented baling chamber has the drawback of not being constructed so as to reliably start a bale core at the beginning of the baling process.

SUMMARY OF THE INVENTION

According to the present invention, there is provided a round baler baling chamber having an improved conveyor arrangement.

An object of the invention is to provide a large round baler with a baling chamber including a conveyor arrangement constructed so as to aid in the formation of a bale core at the beginning of the baling process.

A more specific object of the invention is to provide a large round baler with a baling chamber defined in part by a bottom conveyor including an endless, flexible component arrangement having an run which may be selectively altered in such a way as to cooperate with a lower run of an endless, flexible component arrangement of an upper conveyor in the starting of a bale core.

Yet a more specific object of the invention is to provide a baling chamber for a large round baler, as defined in the immediately preceding object, wherein a support roller for the upper run of the bottom conveyor is mounted for being moved among a starting position, wherein it alters the configuration of the upper run in such a way that it aids in the starting of a bale core, an intermediate range of positions, wherein it aids in supporting a bale being formed in the baling chamber, and a final position, wherein it configures the upper run for easy discharge of a completed bale.

Still, another object of the invention, in accordance with a second embodiment, is to provide a large round baler having a baling chamber as defined in one or more of the preceding objects and which includes a further movable roller that supports a section of a crop-engaging lower run of the upper conveyor, this roller being movable between a starting position, wherein in it configures the upper conveyor run so as to cooperate with the bottom conveyor so as to define a chamber cross section that aids in the start of a bale core, and a second position wherein it is withdrawn into the discharge gate so as not to interfere with the discharge of a completed bale.

These and other objects of the invention will become apparent from a reading of the ensuing description together with the appended drawings.

DESCRIPTION OF THE PREFERRED EMBODIMENT

Figure 1:
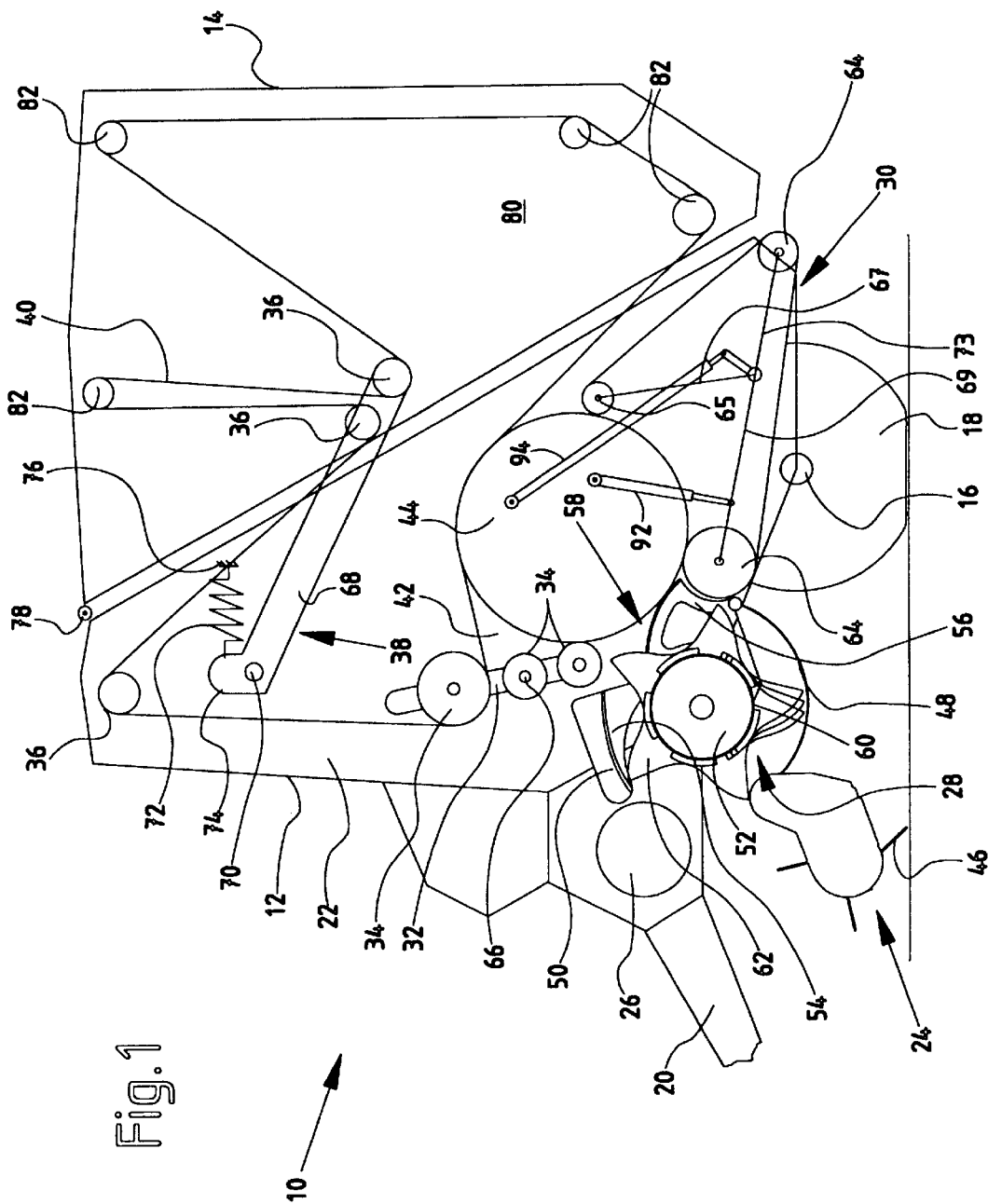
FIG. 1 is a schematic left side view of a large round baler having a baling chamber defined in part by a bottom conveyor constructed in accordance with the principles of the present invention, with a movable roller shown in a raised, bale core starting position.

Referring now to FIG. 1, there is shown a large round baler 10 having a front frame 12 and a discharge gate 14.

The round baler 10 is used in a conventional manner to pick up mowed forage crops and to press them into round bales of variable size. Fundamentally, however, the invention can also be used for a round baler that features a baling chamber with a size that essentially does not change.

The frame 12 comprises an axle 16 with wheels 18, a tongue 20 and side walls 22, and carries a collector or pick-up 24, a rotary conveyor 26, a cutting arrangement 28, a bottom or floor conveyor 30, a carrier 32 with rollers 34, deflection rollers 36, a tensioning device 38, and bale-forming, flexible component arrangement 40. The frame 12 is supported, by the axle 16 and wheels 18, for being pulled over a field by a tractor (not shown) coupled to the forward end of the tongue 20. The tongue 20 may be connected to the frame 12 in a rigid, flexible, or adjustable manner. The side walls 22 are attached rigidly to the frame 12 and they limit the sides of a baling chamber 42 for a round bale 44.

The collector or pick-up 24 is designed in a conventional manner as a pick-up that may have the same, or a greater, width than the baling chamber 42. The collector 24 picks up crops from the ground with overshot, guiding prongs 46 and moves the crops along a conveyor surface, that is not described in greater detail, to the cutting arrangement 28, where it is fed into the baling chamber 42. The conveyor 26 operates in an undershot manner and is designed as a rotor that helps to feed the material guided from the collector 24 into the cutting arrangement 28. The conveyor 26 can feature a smooth surface or it can have drivers, prongs, teeth rigs, screws, or the like.

The cutting arrangement 28 comprises a base 48, a cover 50, a rotor 52, blades 54 and a stripper 56, like those that are known in the art. The cutting arrangement 28 is not important for the invention, but rather it is only cited as an addition to this embodiment. In particular, the blades 54 can be omitted, so that the rotor 52 acts like a simple conveyor. When the cutting arrangement 28 is present, it is used to reduce material fed from the collector 24, so that the material can be better packed in the baling chamber 42. The base 48 extends between the collector 24 and the bottom conveyor 30 and assumes a curvature that essentially follows the radius of the rotor 52.

The cover 50 extends with the same curvature between the conveyor 26 and the carrier 32 or a roller 34 arranged at its lower end region. Upstream of the rotor 52, the base 48 and the cover 50 form a receiving opening and downstream from the rotor, they form an inlet 58 to the baling chamber 42 that is simultaneously limited by the lower roller 34 and the bottom conveyor 30. As viewed from the side, the baling chamber inlet 58 is located in the first quadrant of the rotor 52 and thus is essentially at the side.

The rotor 52 features a central pipe 60 and curving drivers 62 set on the central pipe 60. The central pipe 60 is driven by a drive (not shown) to rotate clockwise, when one looks at the baler from the left side. The drivers 62 are essentially triangular and their tips nearly reach the base 48 and the cover 50. A total of five rows of drivers 62 are welded onto or screwed into the central pipe 60 in a spiral line, wherein the drivers 62 are separated from each other in the axial direction of the rotor 52. The diameter of the rotor 52 is a considerable size and takes up approximately 0.6 m.

The blades 54 are designed in a conventional manner and preferably, they can be locked in various positions and withdrawn if there is an overload. The blades 54 project through not-visible slots in the cover 50 in all, or part, of the intermediate spaces between the drivers 62. The blades 54 are held by a common, adjustable carrier (not shown), and, in one end position, they can extend up to the inner edge of the cover 50. As already mentioned, the blades 54 can also be omitted, so that the rotor 52 is not acting for cutting, but rather only as a conveying rotor. The blades 54 are located over the rotor 52 upstream of the inlet 58.

The strippers 56 are located downstream of the blades 54 and likewise in the intermediate spaces between the drivers 62. An upper edge of the driver 62 runs sloping slightly down and slightly curved on the side which faces the discharge gate 14 as the driver 62 sweeps past the inlet 58. On one side, the strippers 56 border and follow closely the contour of the center pipe 60, and on the other side, they border, the and follow closely the contour of, the front of the bottom conveyor 30. The position of the stripper 56 is chosen so that the round bales 44 can be partially supported on it in the beginning phase of the bale formation and, thus, close the inlet 58 to a certain degree.

In this embodiment, the bottom or floor conveyor 30 is formed from two stationary rollers 64, a movable roller 65 and arms 67, a carrier 69 and an endless, flexible component arrangement 71. The fixed rollers 64 are respectively rotatably mounted in front and rear end regions of the carrier 69. In this embodiment, the front roller 64 features a larger diameter than the rear and moveable rollers 64 and 65, respectively. The movable roller 65 is supported so that it can rotate at the free ends of the vertically pivotable arms 67. The arms 67 are mounted to the carrier 69 between the fixed front and rear rollers 64 in a support 73 and they are dimensioned such that they can position the roller 65 behind the rear roller 64 when they are in a position tilted completely towards the rear. The support 73 for the arms 67 is located in the space between the fixed rollers 64 and between the upper and lower runs of the flexible component arrangement 71. The carrier 69 can be pivoted vertically about a pivot axis that coincides with the rotational axis of the front roller 64 that, in turn, is supported in the frame 12 or its side walls 22. A pair of hydraulic tilt cylinders 92 for the conveyor 30 are respectively mounted between the side walls 22 and the carrier 69 for selectively pivoting the conveyor 30 about the pivot axis defined by the axis of its front roller 64. The flexible component arrangement 71 is tensioned by the rollers 64 and 65 and bridges the distance between the rollers 64 and 65 in order to realize a more or less closed conveyor surface. The flexible component arrangement 71 can be designed from several belts laid next to each other, a conveyor belt, or a chain drive conveyor. The flexible component arrangement 71 is dimensioned such that its upper run can be deflected. According to the required dimensions of the deflection, each rearward roller 64 can be fixed to move radially in the carrier 69. The configuration of the bottom or floor conveyor 30 with the flexible component arrangement 71 is selected for this embodiment, but this is not necessary. Instead of this configuration, several rollers 64 and 65 can also be arranged near each other, which as a whole can essentially form a conveyor surface like that also formed by the flexible component arrangement 71 guided over the rollers 64 and 65. In the position shown in FIG. 1, the bottom conveyor 30 or its carrier 69 essentially assume a horizontal position.

Each arm 67 can pivot in a vertical plane extending in the driving direction and for this purpose is joined to a crank arm located on an outer surface of the adjacent side wall 22 and coupled to a hydraulic cylinder 94 anchored to the side wall. The pivoting motion is controlled such that at the beginning of the baling process the movable roller 65 assumes a position that is to the left and below that shown in FIG. 1, so that a lower run of the bale-forming, endless flexible component arrangement 40 can extend straight or essentially straight and contact or at least be near the movable roller 65. In the position shown in FIG. 2, the round bale 44 has achieved its full size. In this situation, the arms 67 are pivoted with the roller 65 backwards into an approximately two o'clock position. In this position, the movable roller 65 is located in the direct vicinity of a lower front deflection roller 82 of the discharge gate 14, which is described in greater detail below. In this state, the front roller 64 and the movable roller 65 are located essentially at the same height so that the upper run of the flexible component arrangement 71 that extends between them engages the round bale 44 and is deflected downward by its weight so as to define a trough that receives the round bale 44. The rear roller 64 is located essentially vertically below the front roller 64. In the position shown in FIG. 3, the round bale 44 is ready to be discharged, with the arms 67 being located in a rearward pivoted location, wherein the movable roller 65 is located behind, and slightly above, the fixed rear roller 64. In this situation, there results an essentially straight and downward sloping surface of the bottom conveyor 30, on which the round bale 44 can roll downward and onto the ground when the discharge gate 14 is raised, as shown.

The motion of the arms 67 can be controlled in a simplified embodiment also by means of springs, which always bias the movable roller 65 towards the inlet 58 and is only moved backwards towards the discharge gate 14 due to the weight of the round bale 44.

The bottom conveyor 30 limits the baling chamber 42 in its lower region at one part of its periphery. Preferably, at least one of the rollers 64 is driven.

The carrier 32 is designed in the form of a bar resistant to bending, and there are two, namely at each side wall 22, wherein not-shown but adequately reinforcing elements are provided between the two. The carrier 32 can pivot in a vertical plane about a horizontal pivot axis 66 that is perpendicular to the driving direction of the round baler 10. The pivot axis 66 is located between the ends of the carrier 32, and in this embodiment approximately at its center, so that it can move like a rocker.

The rollers 34 can be differentiated into a lower, middle, and an upper roller 34, when there are three rollers 34, which, however, is not necessary. The rollers 34 are supported between the two carriers 32 so that they can rotate and extend across the entire width of the baling chamber 42. The arrangement is chosen such that when the round bale 44 has achieved its full size, the circumference or periphery of the rollers 34 lie on a curved surface that follows the diameter of the round bale 44. The diameters of the lower and middle rollers 34 are greater than that of the upper roller 34. The lower roller 34 is always located near the rearward edge of the rotor cover 50. The rotational axis of the middle roller 34 simultaneously forms the pivot axis 66, which, however, is not necessary and in other embodiments, this can be solved by other means.

In particular, the pivot axis 66 can be adjusted downward, upward, forward, or rearward. Between the middle and upper roller 34 there is a gap, through which the bale-forming, endless, flexible component arrangement 40 runs. The lower and middle rollers 34 directly form a part of a front wall of the baling chamber 42 and force is applied to them directly by the material pressed therein.

The use of the carrier 32 with rollers 34 supported on it is not required for the invention. A single roller or a single deflection roller is sufficient, where this roller guides the bale-forming, flexible component arrangement 40. In the case of a carrier 32, it is advantageous if this can be pivoted, but likewise, this is not required.

A deflection roller 36, that is preferably driven, extends between the side walls 22 in parallel relationship to the rollers 34 at a location spaced essentially vertically above the carrier 32.

The tensioning device 38 comprises a support 70 and an energy storage device 72 that resists movement of a pair of tensioning arms 68 in response to increasing bale size in an essentially known manner. The arms 68 are each formed by a massive steel bar or a steel pipe and, like the carrier 32, they are respectively located in the region of the side walls 22. Each arm 68 extends to the rear from the support 70 and terminates outside a rear edge of the adjacent side wall 22, and is provided with two deflection rollers 36 at the end region remote from the support 70. These deflection rollers 36 are separated from each other in the radial direction from the support 70. The arm 68 extends beyond the support 70 at its forward end region and is slightly angled in order to form a lever arm 74. The support 70 supports the arm 68 at the end region opposite the deflection rollers 36 so that it can pivot vertically. Here, on each side wall 22 there can be a separate support 70 or a support extending between the side walls 22.

The energy storage device 72 in this embodiment is formed by a spiral tension spring. Instead of this, a hydraulic cylinder with a compressed air storage device or throttle, another type of spring, a combination of these, or the like could be used. On one end, the energy storage device 72 is attached to the lever arm 74, and on the other end, it is attached to a holder 76 that contacts the frame 12 or the side wall 22 in a fixed manner. Normally, the energy storage device 72 is at least slightly pre-stressed. However, an embodiment is also conceivable, for which the resistance can be changed by the energy storage device 72, e.g., by means of a controllable throttle, in order to generate a slightly different compaction over the diameter of the round bale 44, so that a so-called soft core can be achieved. The direction of action of the energy storage device 72 is chosen so that the arm 68, with its deflection rollers 36, is always biased downwardly towards the inlet 58, i.e., in the sense of a smallest possible baling chamber 42.

The bale-forming, flexible component arrangement 40 is preferably formed in this embodiment from several narrow belts that are parallel to each other, like those that are known. The bale-forming flexible component arrangement 40 extending through the frame 12 and the discharge gate 14 is enclosed, i.e., it is endless. Alternatively, each of the frame 12 and discharge gate 14 could be provided with its own bale-forming flexible component arrangement. Due to the pivoting ability of the arm 68 and the carrier 32, the lower run or region of the bale-forming, flexible component arrangement 40 extending between the upper roller 34 on the carrier 32 and a lower front deflection roller 82 in the discharge gate 14 can be deflected and changed in length. This region represents part of the boundary of the baling chamber 42 and force is applied directly on this region by the material being wound up and compressed in the baling chamber 42.

The baling chamber 42 is of variable size and includes the inlet 58 at its periphery, as well as the rollers 34 on the carrier 32, the lower run of the bale-forming flexible component arrangement 40, the deflection roller 82 in the discharge gate 14, and the bottom conveyor 30. At the front sides, the baling chamber 42 is essentially closed by the side walls 22.

Figure 2:
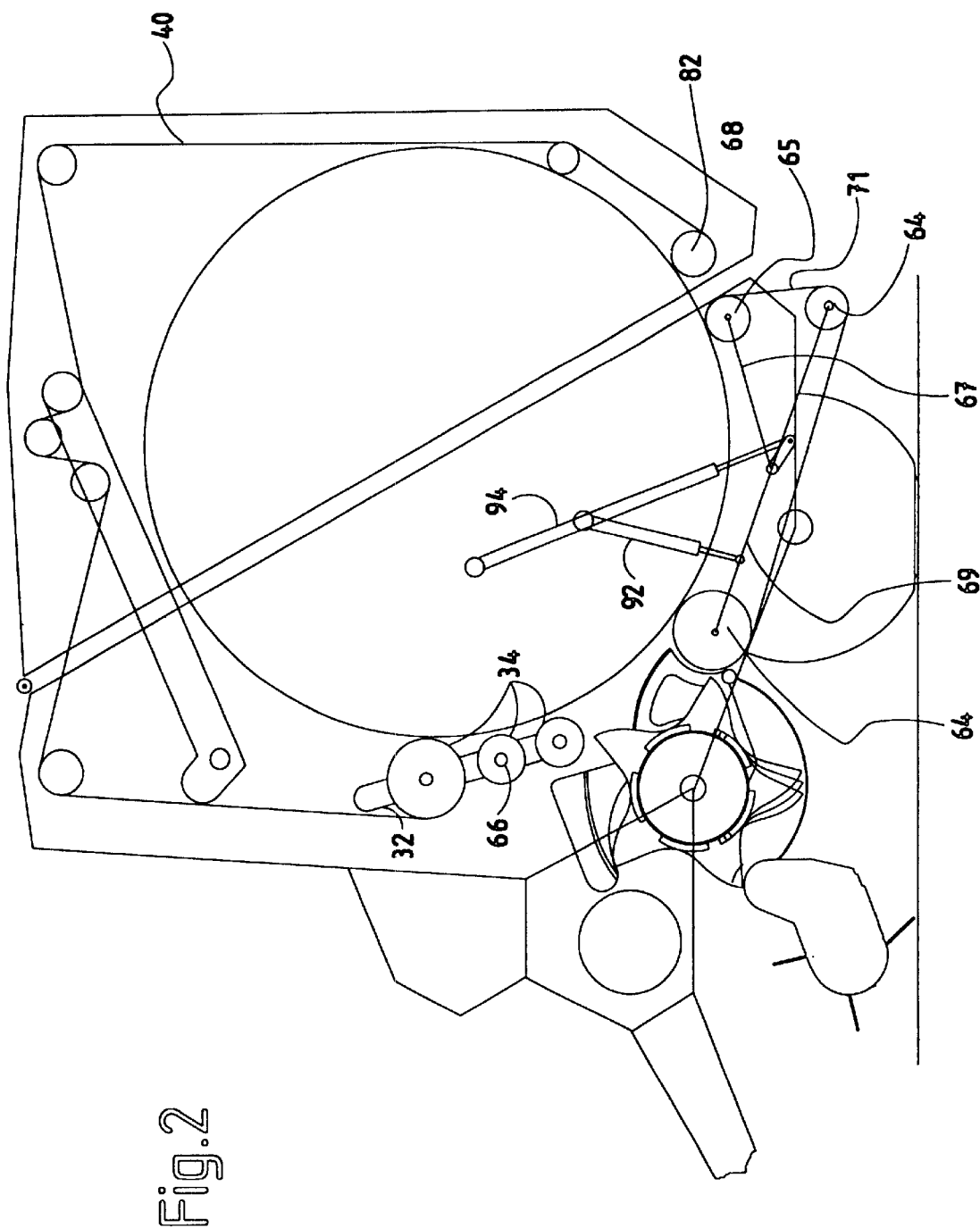
FIG. 2 is a view like FIG. 1, but showing the movable conveyor roller in an intermediate, bale support position.

The round bale 44 is formed from crops that are wound in the shape of a spiral and that finally reach a size like that shown in FIG. 2. For discharging the round bale 44 from the baling chamber 42, the discharge gate 14 is pivoted counterclockwise, i.e., lifted, so that the bottom conveyor 30 can roll the round bale 44 onto the ground. The compaction of the round bale 44 is achieved through the tension of the bale-forming flexible component arrangement 40, which is caused by the energy storage device 72.

The discharge gate 14 is connected to the frame 12 so that it can pivot vertically in a support 78, wherein the pivoting motion is generated by not shown but adequately known hydraulic cylinders. The discharge gate 14 comprises two side walls 80, several deflection rollers 82, and a section of the bale-forming flexible component arrangement 40. The side walls 80 respectively run in the same planes as do the side walls 22 of the frame 12 and cooperate with the side walls 22 to close opposite ends of the baling chamber 42. Known reinforcing elements that are not shown extend between the side walls 80. In this embodiment, there are four deflection rollers 82 that are supported in a stationary but rotatable manner in the side walls 80 and extend parallel to the deflection rollers 36 over the entire width of the baling chamber 42. The deflection rollers 82 are located at the top center, top rear, bottom rear, and at the very bottom front. In a situation according to FIG. 1, the very bottom front deflection roller 82 is in the direct vicinity of the rear roller 64 of the bottom conveyor 30. The deflection rollers 36, that are carried by the arms 68, are respectively provided so as to engage the top of the region of the flexible component arrangement 40 that extends between the upper central and upper rear deflection rollers 82 carried by the discharge gate 14, and to engage the top of the region of the flexible component arrangement 40 that extends between the upper center deflection roller 82 of the discharge gate 14 and the upper front deflection roller 36 of the frame 12.

This results in the following function of the round baler 10 according to FIGS. 1–3.

In a situation that is not shown, in which each arm 68 is located in its lowest position due to the effect of the energy storage device 72, the carrier 32 approximately assumes its position shown in FIG. 1, and the lower run of the flexible component arrangement 40 extending between the upper roller 34 on the carrier 32 and the lower front deflection roller 82 in the discharge gate 14 extend essentially in a plane from front top to back at a slope of approximately 20° from horizontal. The hydraulic motors 94 are then in a condition where they act on the arms 67 so as to lift the roller 65 until it contacts the lower run of the bale-forming flexible component arrangement 40 bordering the baling chamber 42 and converts the otherwise long, triangular baling chamber 42 into a small, nearly equal-sided baling chamber 42 that is quickly filled with baling material. In this case, the baling chamber 42 has a cross sectional shape of a nearly equilateral triangle that defines the smallest volume of the baling chamber 42.

At the beginning of the baling process, the round baler 10 is moved over a field with crops, e.g., formed into windrows, and the crops are collected from the ground by means of the collector 24 and fed to the cutting arrangement 28. The rotor 52 guides the material in an overshot manner and, past the blades 54, if the latter are used, into the baling chamber 42, wherein it is guided by contact with the lower run of the bale-forming flexible component arrangement 40 and the upper run of the flexible component arrangement 71. Due to the rotatable support and if necessary the drive of the rollers 64 and of the rollers 34 together with the packing surface of the lower run of the bale-forming flexible component arrangement 40 and the upper run of the flexible component arrangement 71, a sufficient amount of crops are rotated in the counterclockwise direction, with respect to the view in FIGS. 1–3 of the drawing, to form a bale core. In another embodiment, the round bales 44 can also be wound in the clockwise direction.

With an increasing amount of crops entering the inlet 58, the round baler 10 achieves the operating state illustrated in FIG. 1, in which the arm 68 is moved slightly upward against the effect of the energy storage device 72, and thus the lower run of the bale-forming flexible component arrangement 40 is deflected upwards and assumes a truncated roof-like shape. The carrier 32 is pivoted about the pivot axis 66 slightly in the counterclockwise direction, so that its lower roller 34 is moved to the rear. In this situation, the round bale 44 is supported on the front roller 64 of the bottom conveyor 30, on the strippers 56, and on the region of the upper run of the flexible component arrangement 71 that extends between the front roller 34 and the movable roller 65.

With further feeding of crops, the round bale 44 achieves the size shown in FIG. 2. In this operating state, the arm 68 is pivoted completely upward and the energy storage device 72 is completely tensioned, so that the highest possible compaction is achieved on the peripheral surface of the round bale 44. Because the upper run of the bottom conveyor 30 cannot be optionally withdrawn, the round bale 44 expands upwardly, so that its peripheral surface presses on the top roller 34 and pivots the carrier 32 in the counterclockwise direction about the pivot axis 66. Because the pivot axis 66 is located between the ends of the carrier 32, this pivoting motion causes the lower end region of the carrier 32 with the lower roller 34 to move to the rear and thus to shift the round bale 44 backward so that it is now only supported on the bottom conveyor 30, with its movable roller 65, and the lower front deflection roller 82 in the discharge gate 14. Because the round bale 44 is no longer directly rolling across the inlet 58, new crops can be fed more easily into the baling chamber 42, and because the three rollers 34 press on the peripheral surface of the round bale 44 in the region of the carrier 32, both a good guidance of the round bale 44, and also a high compaction is achieved.

Figure 3:
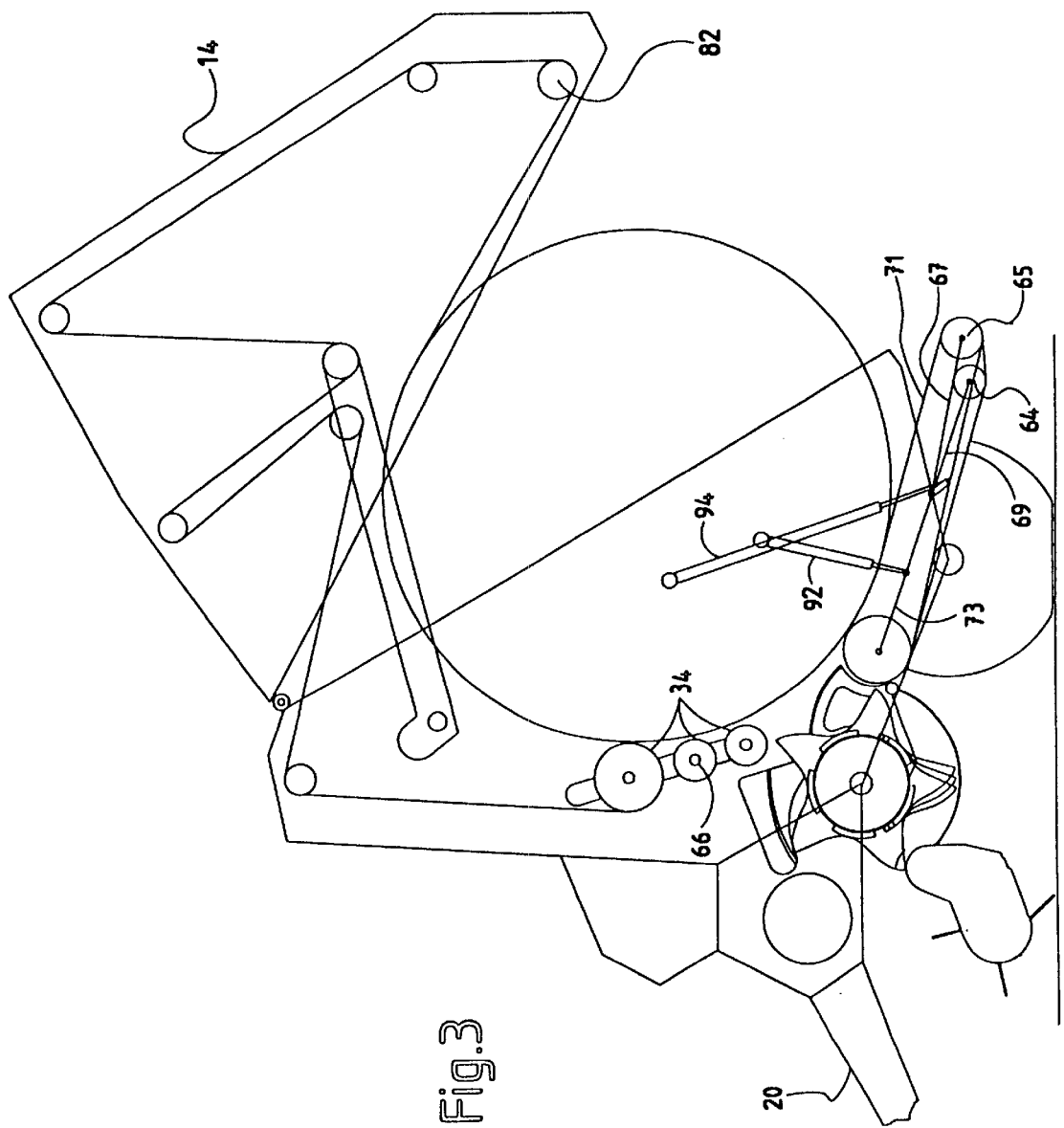
FIG. 3 is a view like FIGS. 1 and 2, but showing the movable conveyor roller in a lowered, bale discharge position.

As viewed in FIG. 3, the round bale 44 is readied for discharge by lifting the discharge gate 14 in the counterclockwise direction about the coupling 78, while the carrier 69 is pivoted clockwise, through extension of the hydraulic motors 92. At the same time, the arm 67 is pivoted to the rear by extension of the hydraulic motors 94 so far that there results an essentially flat top surface of the upper run of the flexible component arrangement 71, on which the round bale 44 can turn with low friction.

Figure 4:
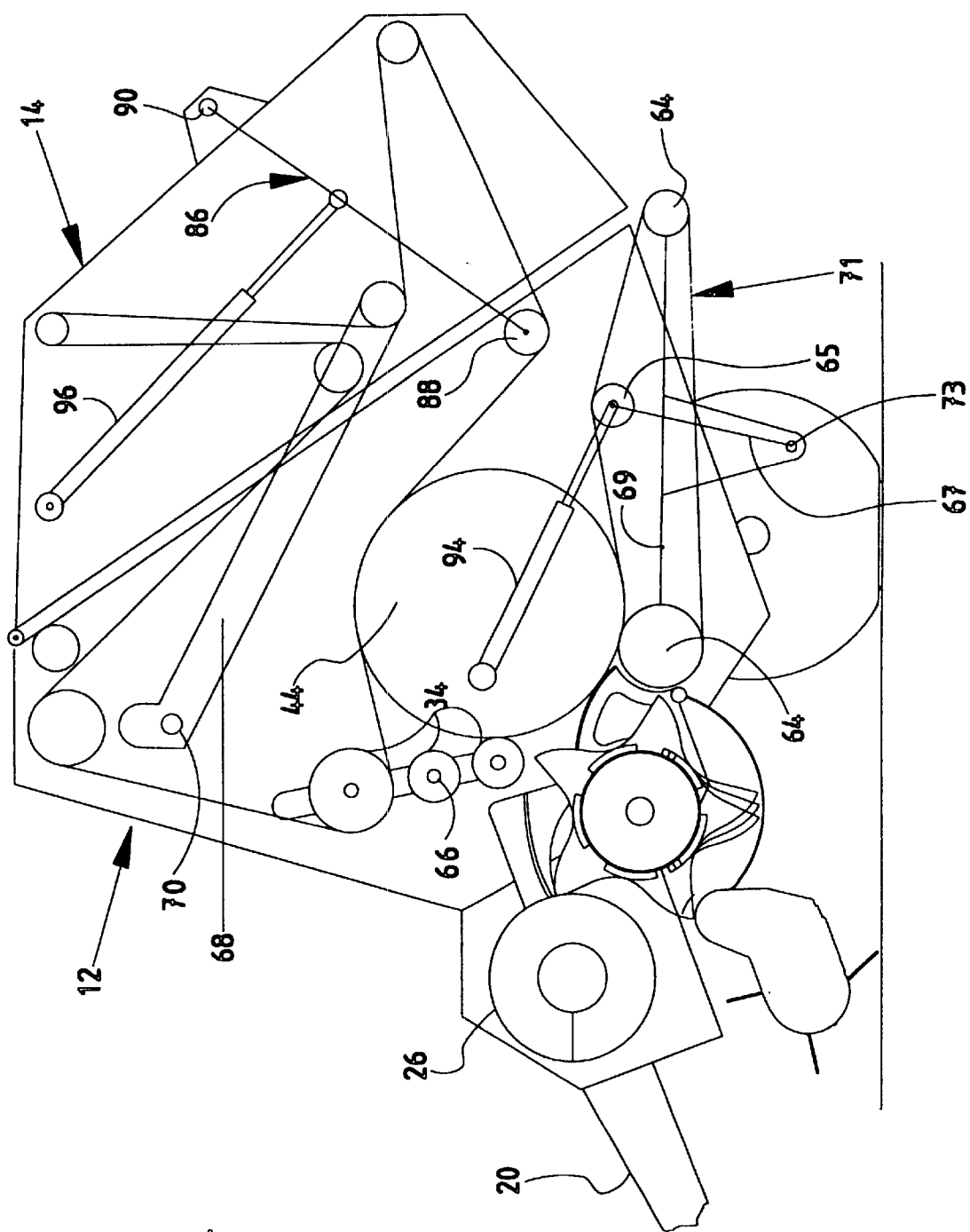
FIG. 4 is a schematic left side view of a large round baler having a baling chamber constructed in accordance with a second embodiment of the invention wherein a bottom conveyor, and an upper conveyor both have movable roller which are each shown in respective bale core starting positions.
Figure 5:
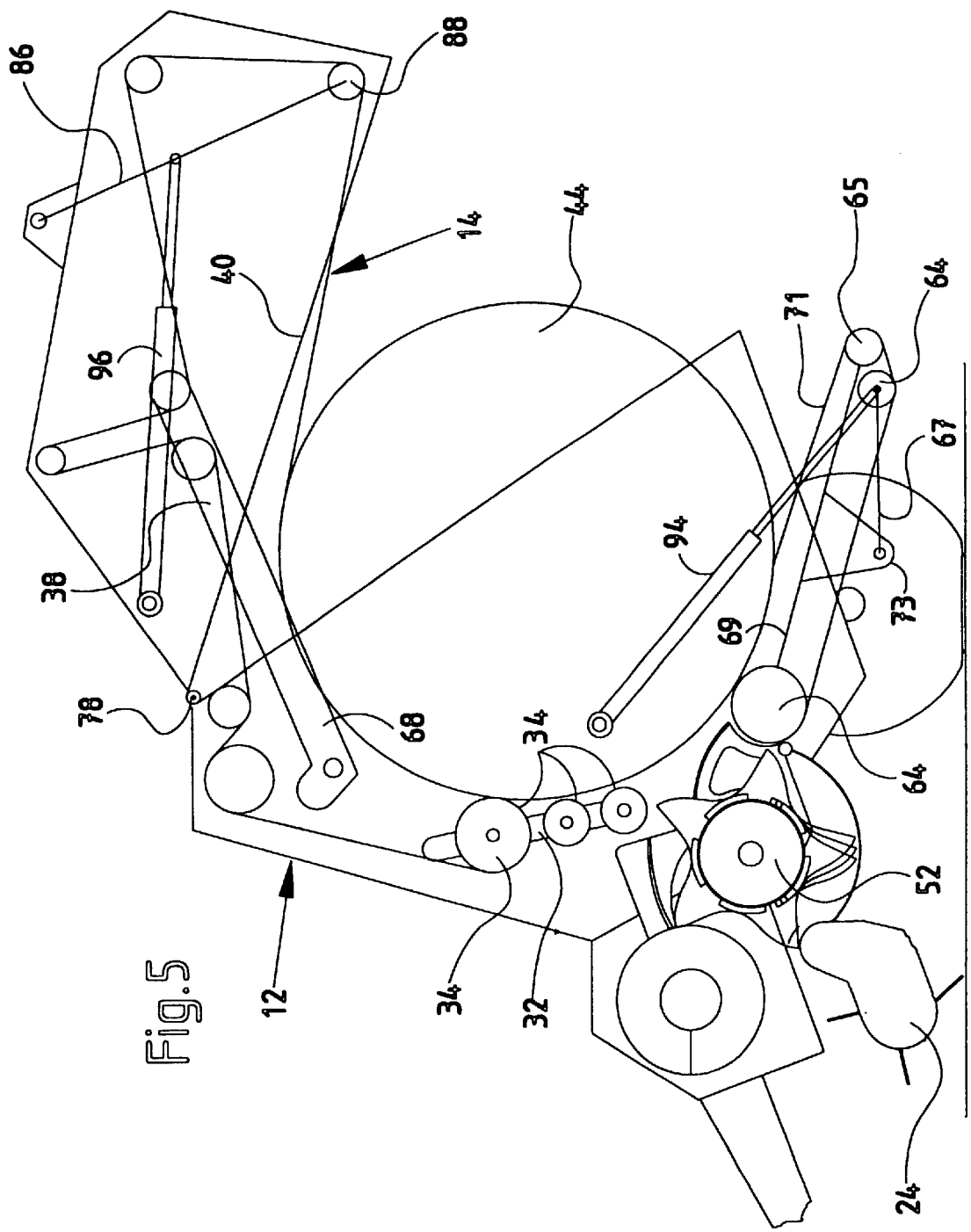
FIG. 5 is a schematic left side view of the large round baler shown in FIG. 4, but with the movable roller being shown in respective bale discharge positions.

FIGS. 4 and 5 show an embodiment of the invention that corresponds to the embodiment according to FIGS. 1–3 to a large extent and also features the same function. However, the discharge gate 14 according to the embodiment in FIGS. 4 and 5 features two vertically pivotable arms 86 with a deflection roller 88 supported on them so that it can rotate, and the arms 67 are supported at a point on the carrier 69 that is located noticeably underneath the lower belt run of the flexible component arrangement 71.

In the condition of the baler shown in FIG. 5, the moving deflection roller 88 appears at the point of the lower front deflection roller 82 in the discharge gate 14 according to the construction of FIGS. 1–3, and has the lower run of the endless flexible component arrangement 40 engaged with its underside. From this position, the deflection roller 88 can be pivoted forward, while maintaining contact with the lower run, to a starting position forward of the discharge gate 14, as seen in FIG. 4. The two arms 86 are controlled by hydraulic motors 96, and/or springs, not shown, such that the moving deflection rollers 88 always keep the baling chamber 42 as small as possible and in this way increases the compaction of the round bale 44. In this way, the control can be done such that the movable rollers 88 and 65 are arranged and guided nearly next to each other during the baling process, as can be seen in FIG. 4. The arms 86 are suspended in a support 90 on the back side of the discharge gate 14.

As can be seen in FIG. 4, the movable roller 65 is mounted to the tops of the arms 67 of the bottom conveyor 30, while the lower end regions of the arms 67 are respectively pivotally mounted in supports 73 fixed to the carriers 69, of the fixed front and rear rollers 64 and located approximately at the height of the axle 16. The length of the arms 67 and the position of the support 73 are dimensioned and located such that the movable roller 65 comes to lie in a position, according to FIG. 5, which is in front of the fixed roller 64, instead of behind it, like in the embodiment according to FIGS. 1–3, i.e., the movable roller 65 can only move between the two fixed rollers 64.

Instead of the attachment of the movable roller 65 on the pivotable arms 67, it is also possible to attach it in sliding or roller guides, in curved tracks, or on multipart guides.

Having described the preferred embodiment, it will become apparent that various modifications can be made without departing from the scope of the invention as defined in the accompanying claims.

What is claimed is:

1. In a large round baler including a mobile main frame supporting transversely spaced frame side walls, a bale-forming chamber formed in part by said side walls, by an upper conveyor arrangement including a first endless flexible component arrangement having a crop-engaging lower run and by a bottom conveyor arrangement including a second endless flexible component arrangement having a crop-engaging upper run spaced below said lower run and extending between front and rear fixed rollers, and said bale-forming chamber having an inlet located at a front location of said chamber between said upper and bottom conveyor arrangements, the improvement comprising: said bottom conveyor arrangement including a moveable roller engaging said second endless flexible component arrangement and being mounted for movement between a starting position, wherein it supports an intermediate portion of said upper run so that said intermediate portion is inclined upward to the rear from said inlet to a location at least in close proximity to said lower run of said upper conveyor, and an ending position, wherein said upper run is supported by said front roller and at least one of said rear and moveable rollers to form a planar support surface inclined downward to the rear from said front fixed roller for discharging a bale resting thereon from said baling chamber.

2. The large round baler, as defined in claim 1, wherein said movable roller is mounted for movement to an intermediate position between said starting and ending positions wherein said moveable roller is located approximately vertically above said fixed rear roller, whereby said front and moveable rollers and said upper run of said bottom conveyor arrangement are adapted for supporting a completed bale prior to discharge of the latter.

3. The large round baler, as defined in claim 2, wherein said moveable roller extends between and is rotatably mounted to first ends of a pair of arms having their respective second ends mounted for pivoting about a horizontal, transverse axis located between said front and rear rollers.

4. The large round baler, as defined in claim 3, wherein said second ends of said pair of arms are pivotally mounted at a location approximately on a line of centers of said front and rear rollers.

5. The large round baler, as defined in claim 3, wherein said second ends of said pair of arms are mounted for pivoting about a location disposed below said flexible component arrangement of said bottom conveyor.

6. The large round baler, as defined in claim 1, wherein said ending position of said moveable roller is slightly above and to the rear of said rear roller.

7. The large round baler, as defined in claim 1, wherein said ending position of said moveable roller is slightly below and in front of said rear roller.

8. The large round baler, as defined in claim 1, wherein a discharge gate having opposite gate side walls is vertically pivotably mounted to an upper rear location of said side walls; said upper conveyor arrangement being partly supported by said discharge gate with said lower run extending between a first roller mounted to a front location of said pair of frame side walls and a lower gate roller mounted to a lower location of said gate side walls; said lower gate roll being mounted for fore-and-aft movement between a forward position located between said frame side walls and adjacent said moveable roller of said bottom conveyor arrangement and a rearward position located between said gate side walls and adjacent said rear roller of said bottom conveyor arrangement.

9. The large round baler, as defined in claim 8, wherein said moveable roller of said bottom conveyor arrangement is mounted for movement such that its ending position is forward and below said rear roller of said bottom conveyor arrangement.

10. The large round baler, as defined in claim 9, wherein said moveable roller is mounted to one end of an arm arrangement having a second end mounted for pivoting about a location between said front and rear rollers of said bottom conveyor arrangement and below said endless flexible component arrangement of said bottom conveyor arrangement.

11. The large round baler, as defined in claim 1, wherein said bottom conveyor arrangement includes a conveyor frame carrying said fixed front and rear rollers; said conveyor frame being mounted for swinging vertically about an axis coincident with a rotational axis of said fixed front roller; and an extensible and retractable actuator being coupled to said conveyor frame for lowering said rear roller relative to said front roller, when formation of a bale is completed, for aiding in the discharge of a finished bale supported by said bottom conveyor assembly.

* * * * *